S. N. CANFIELD.
SULKY RAKE.
APPLICATION FILED APR. 21, 1920.
1,351,158.
Patented Aug. 31, 1920.
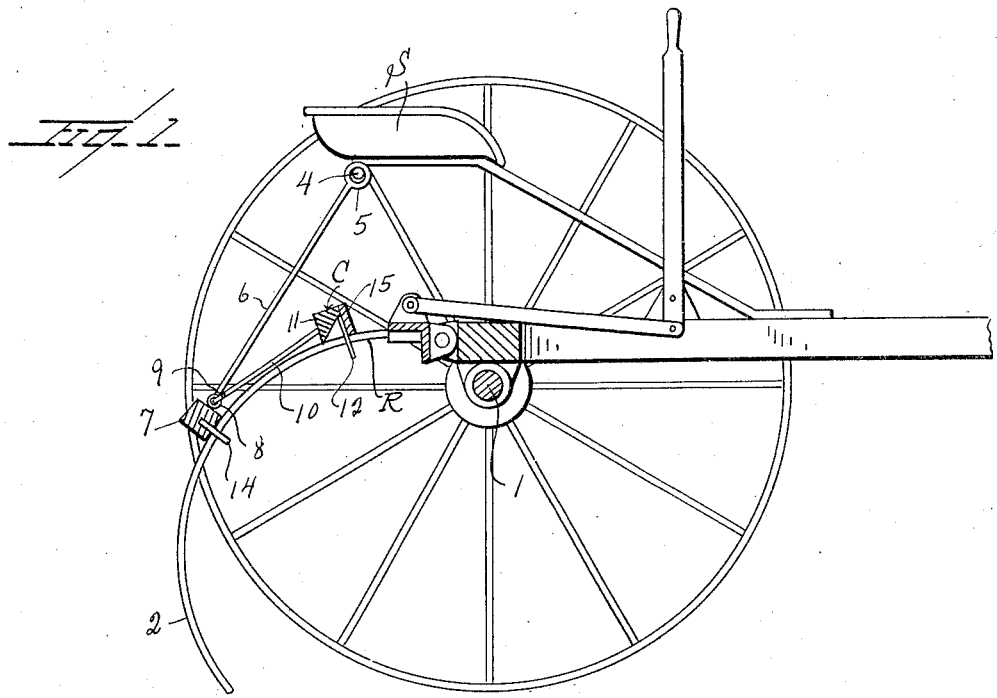
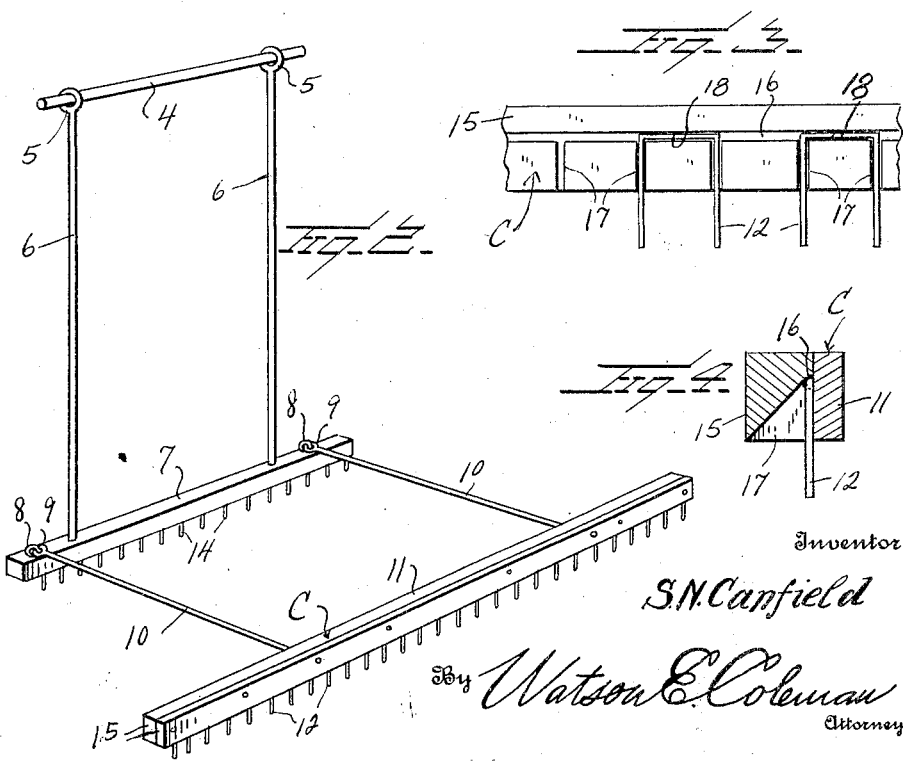
Inventor
S. N. Canfield
By Watson E. Coleman
Attorney

UNITED STATES PATENT OFFICE.

STEPHEN N. CANFIELD, OF HOLLY, COLORADO.

SULKY-RAKE.

1,351,158.  Specification of Letters Patent.  Patented Aug. 31, 1920.

Application filed April 21, 1920. Serial No. 375,595.

*To all whom it may concern:*

Be it known that I, STEPHEN N. CANFIELD, a citizen of the United States, residing at Holly, in the county of Prowers and State of Colorado, have invented certain new and useful Improvements in Sulky-Rakes, of which the following is a specification, reference being had to the accompanying drawings.

This invention relates to certain improvements in sulky rakes and it is an object of the invention to provide improved means whereby the rake may be effectually cleared when raised or elevated.

Another object of the invention is to provide a novel and improved clearer or comb for a sulky rake or the like constructed and mounted in such manner whereby the clearer or comb operates upon the rake to a point in close proximity to the axle.

Another object of the invention is to provide a novel and improved clearer for a sulky rake or the like, embodying a comb resting upon the tines of the rake and which comb is provided with teeth mounted for limited independent swinging movement in one direction to permit said teeth of the comb to readily pass hay or other obstruction when the rake proper is being lowered into working position.

The invention consists in the details of construction and in the combination and arrangement of the several parts of my improved sulky rake whereby certain important objects and advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in side elevation and partly in section, illustrating a sulky rake having applied thereto a comb or cleaning device constructed in accordance with an embodiment of my invention;

Fig. 2 is a view in perspective of my improved cleaning device detached;

Fig. 3 is a fragmentary view in elevation of one of the combs as herein included; and Fig. 4 is a sectional view taken through the assembled comb as illustrated in Fig. 3.

As disclosed in the accompanying drawings 1 denotes a wheel supported axle having operatively engaged therewith in a conventional manner a rake R adapted to swing as desired in a vertical path. The rake R embodies the curved tines 2 of any ordinary or preferred type.

S denotes a seat structure of any desired type and extending transversely of said structure at a point in close proximity to but below the seat 3 proper is a rod 4. The opposite end portions of the rod 4 are disposed through the eyes 5 carried by the upper end portions of the rods 6 whereby said rods 6 are free to swing in a vertical path.

The lower end portions of the rods 6 are rigidly secured to a draw bar 7 which rests upon the tines 2 of the rake R at a predetermined distance rearwardly of the axle 1 when the rake is in its lowered or working position. The opposite end portions of the bar 7 are provided with the inwardly directed eye members 8 with which are interlocked the eyes 9 carried by the rear end portions of the forwardly directed rods 10 whereby said rods 10 are also capable of swinging movement in a vertical path.

The forward end portions of the rods 10 are rigidly attached to the opposite end portions of the head or bar 11 of the clearer or comb C. The head or bar 11 extends entirely along the rake R and rests upon the tines 2 thereof. Depending from the head or bar 11 are the teeth 12 extending between the tines 2 of the rake so that as the rake R is raised or elevated an effective cleaning or clearing of the rake is accomplished. The particular location or position of the clearer or comb C with respect to the draw bar 7 is of utmost importance and advantage as it assures a clearing of the tines 2 back to the coils thereof or to a point in close proximity to the axle 1 so that hay or the like is prevented from accumulating adjacent to the axle 1.

To further facilitate the clearing or cleaning operation, the draw 7 may be provided with the teeth 14 extending between the tines 2.

In the present embodiment of my invention, the head or bar 11 of the clearer or comb C comprises two overlying strips 15 suitably connected one to the other with the inner face of the rear strip 15 provided with a longitudinally directed groove 16 and the longitudinally spaced slots 17 in the lower portion of said strip and in communication from below with the groove 16 with the base of each of said slots on a predetermined incline.

The teeth 12 are arranged in pairs with their inner ends connected by the transverse member 18 which seats within the groove 16 while the teeth 12 are adapted to have limited swinging movement within the slots 17. By this arrangement the teeth 12 may pass hay or other slight obstructions which may be in advance thereof as the rake R is lowered into working position.

From the foregoing description, it is thought to be obvious that a sulky rake constructed in accordance with an embodiment of my invention is particularly well adapted for use by reason of the convenience and facility with which it may be assembled and operated, and it is also obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. In combination with a portable body including a rake supported thereby for vertical swinging movement, a draw bar resting upon the tines of the rake, means for supporting the draw bar for swinging movement in a vertical path, inwardly directed rods pivotally engaged with the draw bar, a head secured to the forward end portions of the rods and resting upon the tines, and teeth carried by the head and extending between the tines of the rake.

2. In combination with a portable body including a rake supported thereby for vertical swinging movement, a draw bar resting upon the tines of the rake, means for supporting the draw bar for swinging movement in a vertical path, inwardly directed rods pivotally engaged with the draw bar, a head secured to the forward end portions of the rods and resting upon the tines, and teeth carried by the head and extending between the tines of the rake, the teeth carried by the head having limited swinging movement with respect to the head in one direction.

3. In combination with a portable body including a seat structure and a rake carried thereby for vertical, swinging movement, a cross rod carried by the seat structure, arms pivotally engaged with said rod and depending therefrom, a draw bar secured to said rods and resting upon the tines of the rake, forwardly directed rods engaged with the draw bar for swinging movement in a vertical path, a head secured to the forward end portions of said last named rods and resting upon the tines of the rake, and teeth carried by said head and extending between the tines of the rake.

4. In combination with a portable body including a rake supported thereby for vertical swinging movement, a draw bar resting upon the tines of the rake, means for supporting the draw bar for swinging movement in a vertical path, inwardly directed rods pivotally engaged with the draw bar, a head secured to the forward end portions of the rods and resting upon the tines, teeth carried by the head and extending between the tines of the rake, and teeth carried by the draw bar extending between the tines of the rake.

5. In combination with a rake supported for vertical swinging movement, a clearer resting upon the tines of the rake and supported for swinging movement, said clearer comprising two overlying elongated strips, the inner face of one of the strips being provided with a groove extending longitudinally thereof, the lower portion of said strip being provided with longitudinally spaced slots, communicating with the groove from below, the base of each of said slots being inclined, and a plurality of pairs of teeth, similar inner end portions of each pair of teeth being connected by a transverse member, said transverse member being positioned within the groove of the strip with the teeth having movement within the slots, the second strip holding the teeth against independent movement when the rake is being elevated, the slots permitting limited swinging movement of the teeth when the rake is being lowered.

In testimony whereof I hereunto affix my signature.

STEPHEN N. CANFIELD.